(12) United States Patent
Yamazaki

(10) Patent No.: US 6,400,360 B1
(45) Date of Patent: Jun. 4, 2002

(54) INFORMATION PROCESSING DEVICE

(75) Inventor: Shunpei Yamazaki, Tokyo (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 09/476,367

(22) Filed: Jan. 3, 2000

Related U.S. Application Data

(62) Division of application No. 08/497,891, filed on Jul. 3, 1995, now Pat. No. 6,034,675.

(30) Foreign Application Priority Data

Jul. 5, 1994 (JP) .............................................. 6-176051

(51) Int. Cl.⁷ ................................................ G09G 5/00
(52) U.S. Cl. ........................ 345/211; 345/212; 364/707
(58) Field of Search .............................. 345/12, 63, 77, 345/211–213; 364/707; 395/132

(56) References Cited

U.S. PATENT DOCUMENTS

| | | | |
|---|---|---|---|
| 5,315,695 A | 5/1994 | Saito et al. | |
| 5,381,161 A | 1/1995 | Sasaki et al. | |
| 5,528,268 A | 6/1996 | Ni et al. | |
| 5,589,848 A | 12/1996 | Shimizu | |
| 5,737,248 A | 4/1998 | Kawasaki et al. | |

FOREIGN PATENT DOCUMENTS

| | | |
|---|---|---|
| JP | 1207813 | 8/1989 |
| JP | 2101498 | 4/1990 |
| JP | 2122321 | 5/1990 |
| JP | 2127717 | 5/1990 |
| JP | 2259918 | 10/1990 |
| JP | 2282815 | 11/1990 |
| JP | 4141689 | 5/1992 |
| JP | 4-355824 | 12/1992 |
| JP | 5073021 | 3/1993 |
| JP | 5127635 | 5/1993 |

*Primary Examiner*—Amare Mengistu
(74) *Attorney, Agent, or Firm*—Eric J. Robinson; Nixon Peabody LLP

(57) ABSTRACT

An input interval of a keyboard of an input device is measure. The luminance of a display device is changed in accordance with the measured input interval of the keyboard.

25 Claims, 4 Drawing Sheets

INFORMATION PROCESSING DEVICE

This application is a Divisional of application Ser. No. 08/497,891, filed Jul. 3, 1995 now U.S. Pat. No. 6,034,675.

BACKGROUND OF TH INVENTION

1. Field of the Invention

The present invention relates to an information processing device having a display device and an inputting means such as a keyboard.

2. Description of the Related Art

FIG. 4 is a block diagram showing a conventional information processing device.

Conventionally, in an information processing device having a display device and a keyboard device as shown in FIG. 4, there has been known a device having a function that the display operation of the display device is stopped when information is not input through the keyboard for a long time. However, there has not been known a device in which the luminance (light emission intensity) of the display device is adjusted in accordance with the keyboard input speed.

The period for which an operator watches the display device when inputting information continuously through a keyboard is different from that when inputting information intermittently. However, because the luminance or contrast of the display device is constant, the eyeballs the operator are liable to be tired when he/she watches the display device for a long time.

However, a CRT display, an example of the display device, has taken no countermeasure against the eyeball fatigue except for employment of a CRT filter.

SUMMARY OF THE INVENTION

In an information processing device having a display device and a keyboard, when an operator inputs, for instance, sentences through the keyboard, the keyboard input. speed differs between a case where he/she inputs characters while simply watching sentences and a case where he/she inputs characters while composing sentences by himself. For example, in the latter case, an operator tends to fix his eyes on the display device for a longer time.

Further, in an operation requiring an operator to watch the display device for a long time, the luminance or contrast of the display device is fixed. That is, there was not provided a function of adjusting the luminance of the display device in consideration of the eyeball fatigue.

In the above circumstances, a method of reducing eyeball fatigue is now required.

To attain the above object, according to the invention, an information processing device comprises:

a display device;

an input device having a keyboard;

means for measuring an input interval of the keyboard; and means for changing a luminance of the display device in accordance with the measured input interval.

According to another aspect of the invention, an information processing device comprises:

a display device;

an input device having a keyboard;

a timer circuit for measuring an input interval of the keyboard; and means for changing a luminance of the display device in accordance with the measured input interval.

According to another aspect of the invention, an information processing device comprises:

a display device;

an input device having a keyboard;

means for measuring an input interval of the keyboard; and means for changing a luminance of the display device in accordance with the measured input interval, the luminance being divided into arbitrary levels.

According to another aspect of the invention, an information processing device comprises:

a display device;

an input device having a keyboard;

means for measuring an input interval of the keyboard; and means for changing a luminance of the display device in accordance with a ratio of a first average of input intervals of the keyboard over a first arbitrarily selected period to a second average of input intervals over a second arbitrarily selected period that is longer than the first arbitrarily selected period.

According to a further aspect of the invention, an information processing device comprises:

a display device;

an input device having a keyboard;

means for measuring an input interval of the keyboard; and means for changing a luminance of the display device in accordance with a ratio of an input interval of the keyboard to an average of input intervals over an arbitrarily selected period.

According to another aspect of the invention, an information processing device comprises:

a display device;

an input device having a keyboard;

means for measuring an input interval of the keyboard;

means for changing a luminance of the display device in accordance with the measured input interval; and means for selecting one of a state that the luminance is changed and a state that the luminance is kept at an ordinary level.

According to another aspect of the invention, an information processing device comprises:

a display device;

an input device having a keyboard;

means for measuring an input interval of the keyboard; and means for changing a luminance of the display device in accordance with a ratio of a first average of input intervals of the keyboard over a first arbitrarily selected period to a second average of input intervals over a second arbitrarily selected period that is longer than the first arbitrarily selected period, the luminance being divided into arbitrary levels.

According to another aspect of the invention, an information processing device comprises:

a display device;

an input device having a keyboard;

means for measuring an input interval of the keyboard; and means for changing a luminance of the display device in accordance with the measured input interval such that the luminance increases as a ratio of an input interval of the keyboard to an average of input intervals over an arbitrarily selected period increases, the luminance being divided into arbitrary levels.

According to still another aspect of the invention, an information processing device comprises:

a display device;

an input device having a keyboard;

means for measuring an input interval of the keyboard; and means for changing a luminance of the display device in accordance with the measured input interval such that the luminance decreases as a ratio of an input interval of the keyboard to an average of input intervals over an arbitrarily selected period increases, the luminance being divided into arbitrary levels.

In the above constitution, in an information processing device (a personal computer, a word processor, an information processing terminal, or the like) having a display device and an input device having a keyboard, an input interval of the keyboard is measured by a measuring means, for instance, a timer circuit incorporated in the information processing device. The luminance of the display device is adjusted in accordance with the measured input interval. With this constitution, the eyeball fatigue of an operator can be reduced.

According to another aspect of the invention, an information processing device comprises:

a display device, a luminance of the display device being changed every predetermined time interval; and a keyboard input device.

According to another aspect of the invention, an information processing device comprises:

a display device, a luminance of the display device being changed every predetermined time interval;

a keyboard input device; and means for selecting one of a state that the luminance is changed and a state that the luminance is kept at an ordinary level.

In the above constitution, the input interval means a period between a time when an operator inputs first information to the information processing device through the keyboard input device and a time when he inputs second information is inputted. In general, the input interval is a period between a depression of a certain key and the next key.

A typical example of the keyboard input device is a typewriter type keyboard. Further, the keyboard input device may be means with which an operator directly inputs information to the information processing device using a part of his body, a pen, or the like, such as a mouse, tablet, digitizer, or touch panel.

The display device may be a liquid crystal display (LCD), a CRT display, a plasma display device, a projector, or the like.

The luminance means intensity of light emitted from the display device to an operator, such as light emitted from a back lighting device of an LCD or CRT, light reflected from a screen, or light emitted from a plasma display device.

With the above constitution, eyeball fatigue of an operator of the information processing device can be reduced.

DETAILED DESCRIPTION OF THE PREFERRED EMBODIMENTS

Embodiment 1

Figure 1:
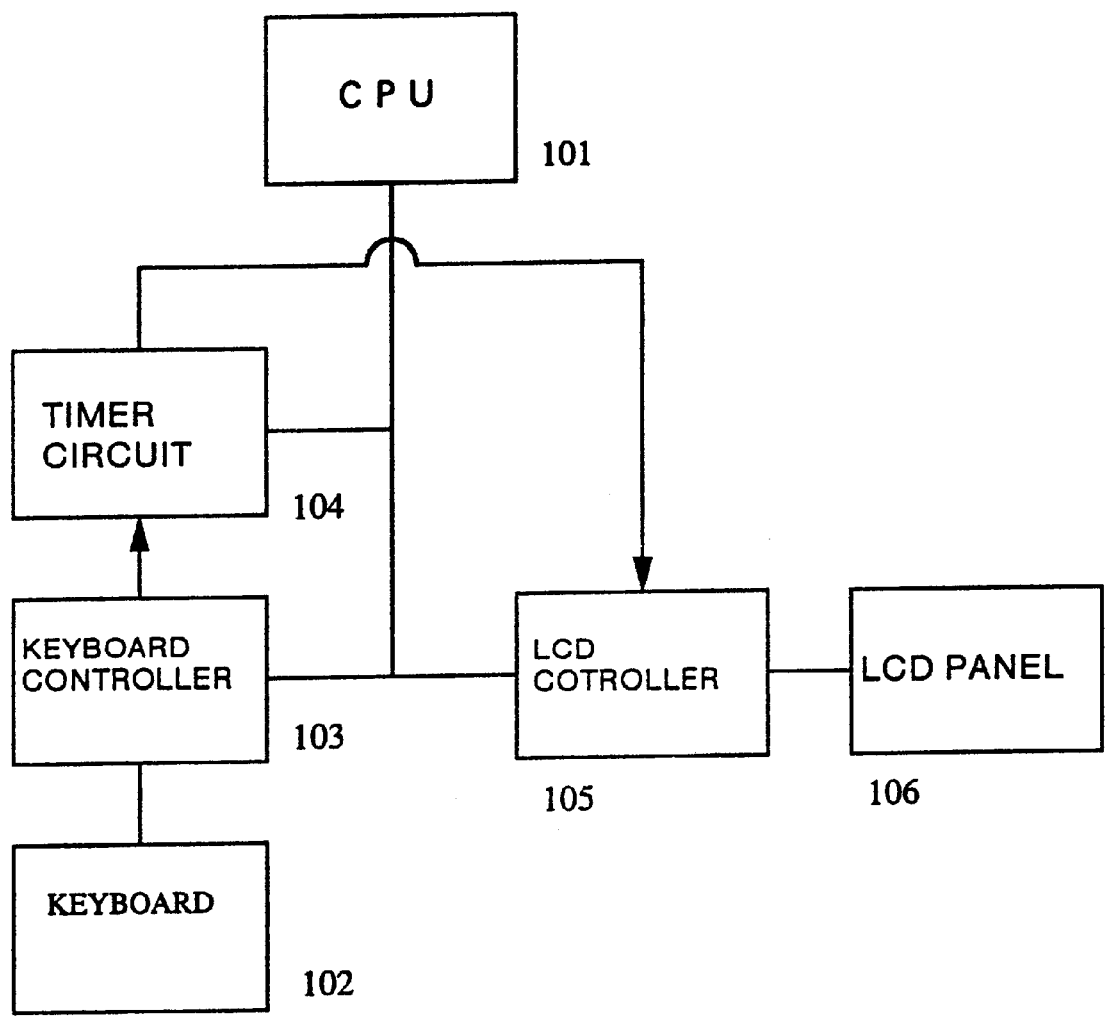
FIG. 1 is a block diagram showing an information processing device according to a first or third embodiment of the present invention.

FIG. 1 is a block diagram showing an information processing device according to a first embodiment of the present invention.

A CPU (central processing unit) 101 of the information processing device controls a keyboard 102, a keyboard controller 103, a timer circuit 104, and a LCD (liquid crystal display) controller 105.

The keyboard 102 is used to input data to the information processing device. Input data is supplied to the CPU 101 via the keyboard controller 103, transferred to the LCD controller 105 from the CPU 101, and displayed on a LCD panel 106.

The keyboard controller 103 controls the keyboard 102, and performs data input control and transmission of an interrupt signal.

The timer circuit 104 has two timers that start a counting operation upon receiving an interrupt signal from the keyboard controller 103. More specifically, a first timer starts its counting operation upon receiving an interruption signal from the keyboard 102, and a second timer starts its counting operation upon receiving the next interrupt signal from the keyboard 102 while the counting operation of the first timer is stopped. In this manner, time intervals between keyboard interruptions can be measured with the timer circuit 104.

The LCD controller 105 controls the LCD panel 106. That is, the LCD controller 105 receives data from the CPU 101, and supplies it to the LCD panel 106. Further, the LCD controller 105 has a function of adjusting the luminance of a back lighting device in accordance with the time intervals between keyboard interruptions.

A description will be made of an actual operation.

Upon receiving data from the keyboard 102, the keyboard controller 103 outputs an interruption signal, and activates a first timer of the timer circuit 104 to make it start counting. Upon receiving the next data, the keyboard controller 103 activates a second timer while stopping the counting of the first timer of the timer circuit 104.

The CPU 101 calculates an interval between the two inputs based on a count value of the first timer, and stores the calculated interval into a memory. After the above operation is repeated, the CPU 101 calculates an average of a plurality of input intervals. The CPU 101 then measures an input interval of the keyboard 102, and divides a measured input interval by the average. Based on a resulting value, the CPU 101 sets, in the LCD controller 105, a luminance of the back lighting device corresponding to the measured input interval. The LCD controller 105 controls the back lighting device of the LCD panel 106 so that it produces the luminance thus set.

In the above manner, the luminance of the back lighting device of the LCD panel 106 can be changed in accordance with the input interval of the keyboard 102.

More specifically, when input intervals of the keyboard 102 are short, the luminance of the back lighting device of the LCD panel 106 is gradually increased and finally the ordinary luminance is maintained.

On the other hand, when input intervals of the keyboard 102 are long, the luminance of the back lighting device of the LCD panel 106 is gradually decreased and finally a minimum-level luminance that can be recognized by human eyes is maintained.

Long input intervals of the keyboard 102 are considered to be resulted from one of the following two situations. The first situation is that an operator is inputting sentences while composing those by himself. In this case, since he is fixing his eyes on the LCD panel 106, it is preferred that the luminance of the back lighting device be made low. The second situation is that an operator is not using the information processing device because he is doing another job. In this case, decreasing the luminance of the back lighting device is effective in reducing the power consumption.

In this embodiment, the luminance is increased when the input interval of the keyboard 102 is short, and it is decreased when the input interval is long. Alternatively, depending on an operator's preference, the luminance may be increased or made the ordinary level when the input interval is long.

Embodiment 2

Figure 2:
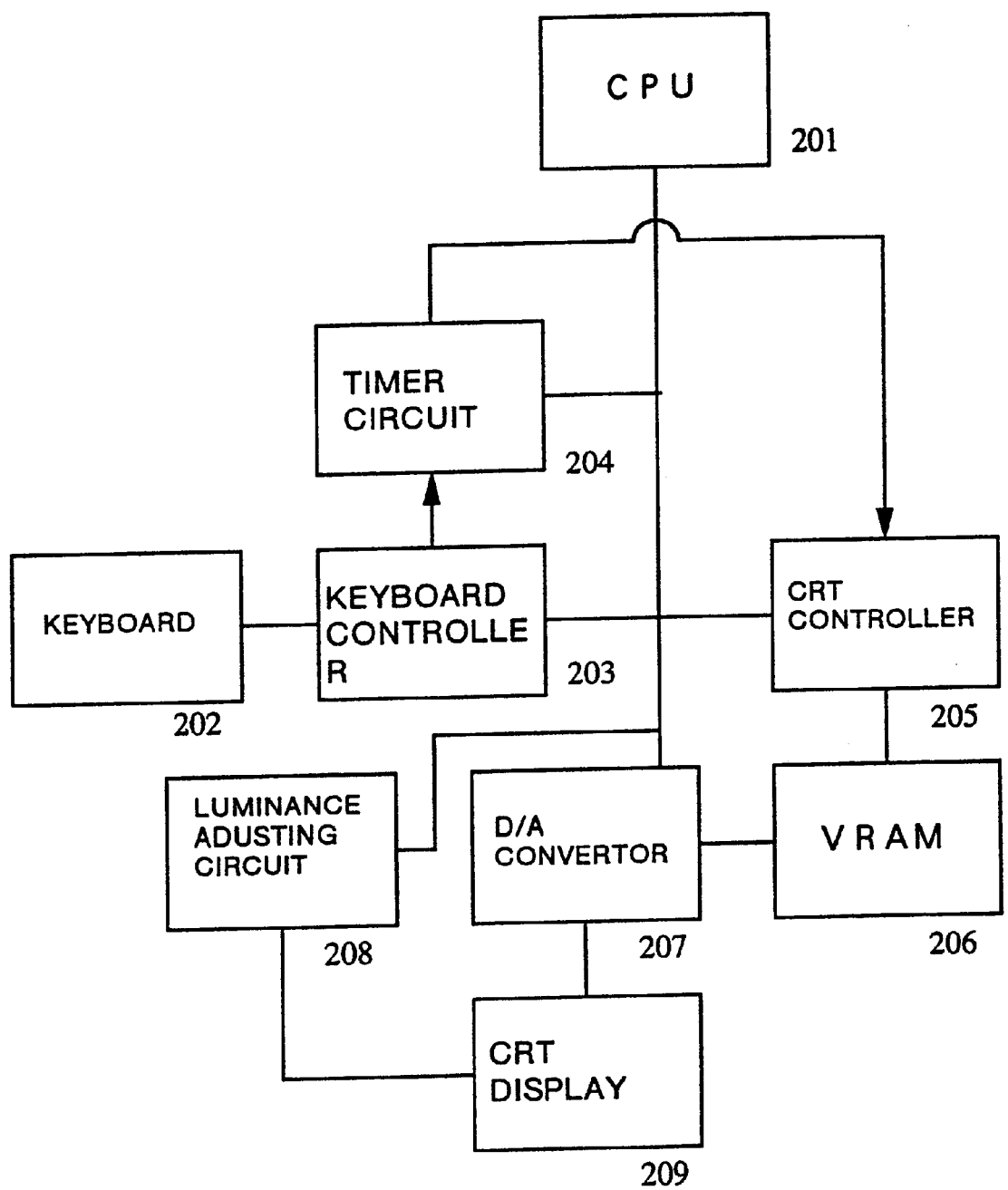
FIG. 2 is a block diagram showing an information processing device according to a second or fourth embodiment of the invention.

FIG. 2 is a block diagram showing an information processing device according to a second embodiment of the invention.

A CPU 201 of the information processing device controls a keyboard 202, a keyboard controller 203, a timer circuit 204, and a CRT (cathode ray tube) controller 205.

The keyboard 202 is used to input data to the information processing device. Input data is supplied to the CPU 201 via the keyboard controller 203, transferred to the CRT controller 205 from the CPU 201, and temporarily stored into a VRAM (video random access memory). Then, the input data is subjected to a signal conversion in a D/A converter 207, and displayed on a CRT display 209.

The keyboard controller 203 controls the keyboard 202, and performs data input control and transmission of an interrupt signal.

The timer circuit 204 has two timers that start a counting operation upon receiving an interrupt signal from the keyboard controller 203. More specifically, a first timer starts its counting operation upon receiving an interruption signal from the keyboard 202, and a second timer starts its counting operation upon receiving the next interrupt signal from the keyboard 202 while the counting operation of the first timer is stopped. In this manner, time intervals between keyboard interruptions can be measured with the timer circuit 204.

The CRT controller 205 stores input data into the VRAM 206, and controls the VRAM 206.

The D/A converter 207 converts color digital signals to analog signals, which are supplied to the CRT display 209.

When data for changing the luminance is written to a luminance adjusting circuit 208 from the CPU 201, the luminance adjusting circuit supplies a signal for adjusting the luminance to the CRT display 209.

A description will be made of an actual operation.

Upon receiving data from the keyboard 202, the keyboard controller 203 outputs an interruption signal, and activates a first timer of the timer circuit 204 to make it start counting. Upon receiving the next data, the keyboard controller 203 activates a second timer while stopping the counting of the first timer of the time circuit 204.

The CPU 201 calculates an interval between the two inputs based on a count value of the first timer, and stores the calculated interval into a memory. After the above operation is repeated, the CPU 201 calculates an average of a plurality of input intervals. The CPU 201 then measures an input interval of the keyboard 102, and divides a measured input interval by the average. Based on a resulting value, the CPU 201 sets, in the luminance adjusting circuit 208, a luminance of the CRT display 209 corresponding to the measured input interval. Thus, the CRT display is adjusted.

In the above manner, the luminance of the CRT display 208 can be changed in accordance with the input interval of the keyboard 202.

In this embodiment, the luminance is increased when the input interval of the keyboard 202 is short, and it is decreased when the input interval is long. Alternatively, depending on an operator's preference, the luminance may be increased or made the ordinary level when the input interval is long.

Embodiment 3

The block diagram of FIG. 1 also shows an information processing device according to a third embodiment of the invention.

A CPU 101 of the information processing device controls a keyboard 102, a keyboard controller 103, a timer circuit 104, and a LCD controller 105.

The keyboard 102 is used to input data to the information processing device. Input data is supplied to the CPU 101 via the keyboard controller 103, transferred to the LCD controller 105 from the CPU 101, and displayed on the LCD panel 106.

The keyboard controller 103 controls the keyboard 102, and performs data input control and transmission of an interrupt signal.

The timer circuit 104 is a timer that outputs an interrupt signal based on a setting value of the CPU 101. Based on the interrupt signal from the timer circuit 104, the CPU 101 sets the LCD controller 105 so that the LCD controller 105 changes the luminance of a back lighting device in a step-like manner.

The LCD controller 105 controls the LCD panel 106. That is, the. LCD controller 105 receives data from the CPU 101, and supplies it to the LCD panel 106. Further, the LCD controller 105 has a function of changing the luminance of the back lighting device on a regular basis based on interrupt signals from the timer circuit 104.

A description will be made of an actual operation.

Figure 3:
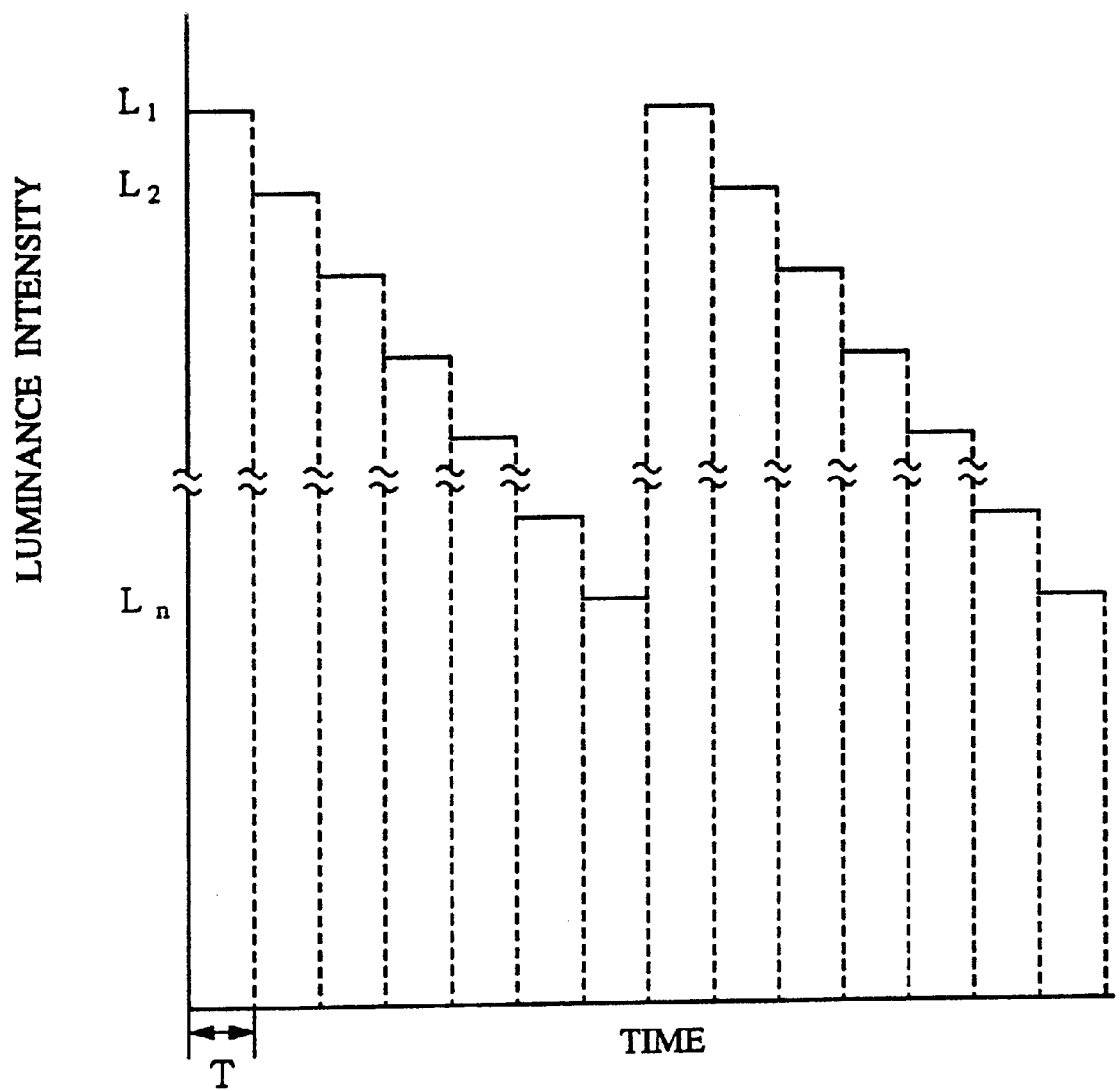
FIG. 3 is a graph showing a variation of the luminance of a back lighting device in the third embodiment of the invention.
Figure 4:
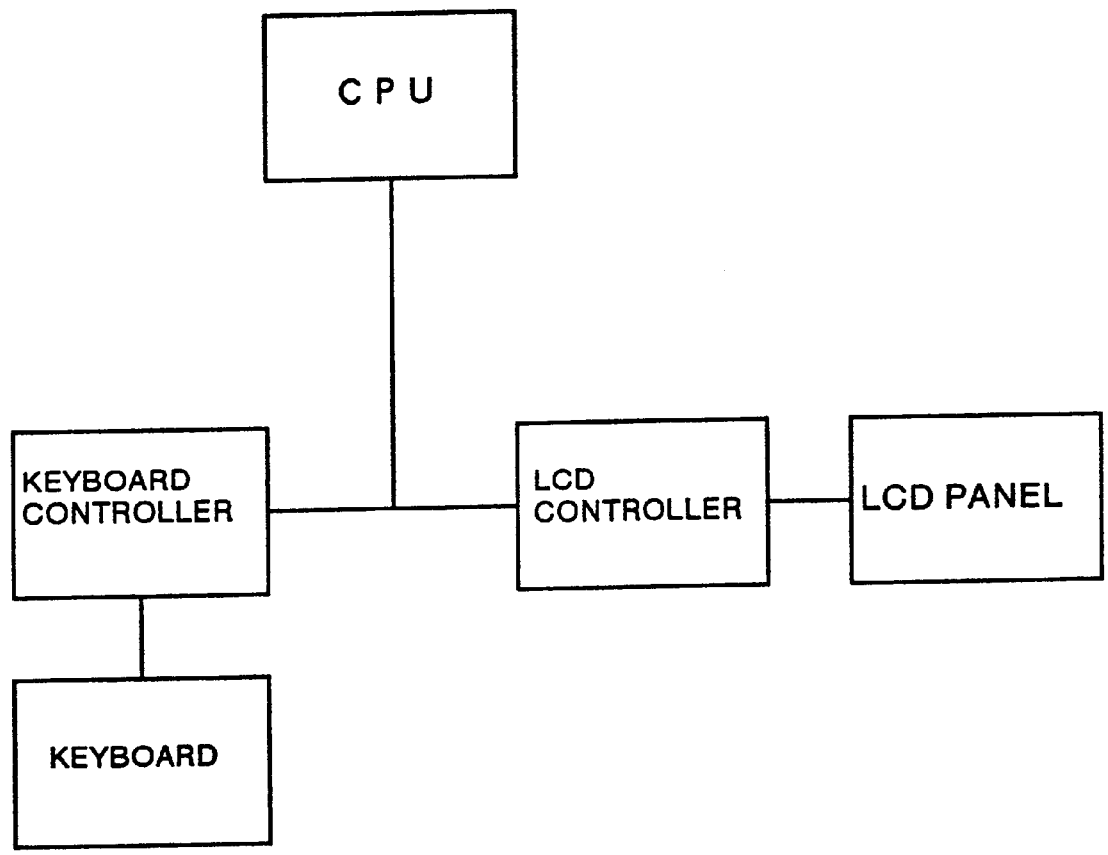
FIG. 4 is a block diagram showing a conventional information processing device.

When the power of the information processing device is turned on, the CPU 101 sets an arbitrary setting value in the timer circuit 104, and the timer circuit 104 starts a counting operation. When the count value of the timer circuit 104 has reached a time corresponding to the setting value, the timer circuit 104 supplies an interrupt signal to the CPU 101. The CPU 101 sets the LCD controller 105 so that the luminance of the back lighting device of the LCD panel 106 is changed as shown in FIG. 3.

A description will be made of the luminance of the back lighting device shown in FIG. 3.

At first, the back lighting device produces an ordinary luminance L1. After a lapse of a time interval T that is determined by the setting value of the timer circuit 104, the luminance of the back lighting device is decreased to $L_2$. As a result of repetition of the above operation, the back lighting device produces a luminance $L_n$ after a lapse of a time nT. After a lapse of the next time interval T, the luminance is returned to $L_1$. The luminance is thereafter decreased in the same manner as described above. An operator can arbitrarily select setting values of $L_1$–$L_n$ and T.

By decreasing the luminance in a predetermined period in the above manner, when an operator uses the information processing device for a long time, the eyeball fatigue can be reduced from the case where the luminance is kept at a high level. Alternatively, depending on an operator's preference, the luminance may be made the ordinary level.

Embodiment 4

The block diagram of FIG. 2 also shows an information processing device according to a fourth embodiment of the invention.

A CPU 201 of the information processing device controls a keyboard 202, a keyboard controller 203, a timer circuit 204, and a CRT (cathode ray tube) controller 205.

The keyboard 202 is used to input data to the information processing device. Input data is supplied to the CPU 201 via the keyboard controller 203, transferred to the CRT controller 205 from the CPU 201, and temporarily stored into a VRAM 206 (video random access memory). Then, the input data is subjected to a signal conversion in a D/A converter 207, and displayed on a CRT display 209.

The keyboard controller 203 controls the keyboard 202, and performs data input control and transmission of an interrupt signal.

The timer circuit 204 is a timer that outputs an interrupt signal based on a setting value of the CPU 201. Based on the interrupt signal from the timer circuit 204, the CPU 201 sets the luminance adjusting circuit 208 so that the luminance adjusting circuit 208 changes the luminance of the CRT display 209 in a step-like manner.

The CRT controller 205 stores input data into the VRAM 206, and controls the VRAM 206.

The D/A converter 207 converts color digital signals to analog signals, which are supplied to the CRT display 209.

When data for changing the luminance is written to the luminance adjusting circuit 208 from the CPU 201, the luminance adjusting circuit supplies a signal for adjusting the luminance to the CRT display 209.

A description will be made of an actual operation.

When the power of the information processing device is turned on, the CPU 201 sets an arbitrary setting value in the timer circuit 204, and the timer circuit 204 starts a counting operation. When the count value of the timer circuit 204 has reached a time corresponding to the setting value, the timer circuit 204 supplies an interrupt signal to the CPU 201. The CPU 201 sets the luminance adjusting circuit 208 so that the luminance of the back lighting device of the CRT display 209 is changed as shown in FIG. 3.

A description will be made of the luminance of the back lighting device shown in FIG. 3.

At first, the CRT display 209 produces an ordinary luminance $L_1$. After a lapse of a time interval T that is determined by the setting value of the timer circuit 204, the luminance of the CRT display 209 is decreased to $L_2$. As a result of repetition of the above operation, the CRT display 209 produces a luminance $L_n$ after a lapse of a time nT. After a lapse of the next time interval T, the luminance is returned to $L_1$. The luminance is thereafter decreased in the same manner as described above. An operator can arbitrarily select setting values of $L_1$–$L_n$ and T.

By decreasing the luminance in a predetermined period in the above manner, when an operator uses the information processing device for a long time, the eyeball fatigue can be reduced from the case where the luminance is kept at a high level. Alternatively, depending on an operator's preference, the luminance may be made the ordinary level.

As described above, according to the invention, in a information processing device having a display device and a keyboard input device, fatigue of eyeballs of a person who uses the information processing device for a long time can be reduced by adjusting the luminance of the display device in accordance with the keyboard input speed or periodically.

Although the above description is mainly directed to the case of adjusting or controlling the luminance, it goes without saying that the contrast or hue may be changed instead.

What is claimed is:

1. An information processing device comprising:

a display device;

an input device;

a timer circuit for measuring an input interval of the input device;

a display controller for changing a luminance of the display device a CPU for calculating an average of input intervals of the input device over an arbitrarily selected period, wherein the luminance of the display device is changed in accordance with a ratio of an input interval of the input device to the average of input intervals.

2. A device according to claim 1, wherein the display device is at least one selected from the group consisting of a liquid crystal display device, a CRT display device, a plasma display device, and a projector.

3. A device according to claim 1, wherein the input device is at least one selected from the group consisting of a keyboard, a mouse, a tablet, a digitizer, and a touch panel.

4. A device according to claim 1, wherein the information processing device is one selected from the group consisting of a personal computer, a word processor and an information processing terminal.

5. A device according to claim 1, wherein the information processing device further comprises at least one selected from the group consisting of a VRAM and a D/A converter.

6. An information processing device comprising:

a display device;

an input device;

a timer circuit for measuring an input interval of the input device;

a display controller for changing a luminance of the display device;

a CPU for calculating an average of input intervals of the input device, wherein the luminance of the display device is changed in accordance with a ratio of a first average of input intervals of the input device over a first arbitrarily selected period to a second average of input intervals over a second arbitrarily selected period that is longer than the first arbitrarily selected period.

7. A device according to claim 6, wherein the display device is at least one selected from the group consisting of a liquid crystal display device, a CRT display device, a plasma display device, and a projector.

8. A device according to claim 6, wherein the input device is at least one selected from the group consisting of a keyboard, a mouse, a tablet, a digitizer, and a touch panel.

9. A device according to claim 6, wherein the information processing device is one selected from the group consisting of a personal computer, a word processor and an information processing terminal.

10. A device according to claim 6, wherein the information processing device further comprises at least one selected from the group consisting of a VRAM and a D/A converter.

11. An information processing device comprising:

a display device;

an input device;

a timer circuit for measuring an input interval of the input device;

a display controller for changing a luminance of the display device; and a CPU for calculating an average of input intervals of the input device, wherein the luminance of the display device is changed in accordance with a ratio of a first average of input intervals of the input device over a first arbitrarily selected period to a second average of input intervals over a second arbitrarily selected period that is longer than the first arbitrarily selected period, the luminance being divided into arbitrary levels.

12. A device according to claim 11, wherein the display device is at least one selected from the group consisting of a liquid crystal display device, a CRT display device, a plasma display device, and a projector.

13. A device according to claim 11, wherein the input device is at least one selected from the group consisting of a keyboard, a mouse, a tablet, a digitizer, and a touch panel.

14. A device according to claim 11, wherein the information processing device is one selected from the group consisting of a personal computer, a word processor and an information processing terminal.

15. A device according to claim 11, wherein the information processing device further comprises at least one selected from the group consisting of a VRAM and a D/A converter.

16. An information processing device comprising:

a display device;

an input device;

a timer circuit for measuring an input interval of the input device;

a display controller for changing a luminance of the display device; and a CPU for calculating an average of input intervals of the input device over an arbitrarily selected period, wherein the luminance of the display device is changed in accordance with the measured input interval such that the luminance increases as a ratio of an input interval of the input device to said average of input intervals increases, the luminance being divided into arbitrary levels.

17. A device according to claim 16, wherein the display device is at least one selected from the group consisting of a liquid crystal display device, a CRT display device, a plasma display device, and a projector.

18. A device according to claim 16, wherein the input device is at least one selected from the group consisting of a keyboard, a mouse, a tablet, a digitizer, and a touch panel.

19. A device according to claim 16, wherein the information processing device is one selected from the group consisting of a personal computer, a word processor and an information processing terminal.

20. A device according to claim 16, wherein the information processing device further comprises at least one selected from the group consisting of a VRAM and a D/A converter.

21. An information processing device comprising:

a display device;

an input device;

a timer circuit for measuring an input interval of the input device; and a display controller for changing a luminance of the display device; and a CPU for calculating an average of input intervals of the input device over an arbitrarily selected period, wherein the luminance of the display device is changed in accordance with the measured input interval such that the luminance decreases as a ratio of an input interval of the input device to said average of input intervals increases, the luminance being divided into arbitrary levels.

22. A device according to claim 21, wherein the display device is at least one selected from the group consisting of a liquid crystal display device, a CRT display device, a plasma display device, and a projector.

23. A device according to claim 21, wherein the input device is at least one selected from the group consisting of a keyboard, a mouse, a tablet, a digitizer, and a touch panel.

24. A device according to claim 21, wherein the information processing device is one selected from the group consisting of a personal computer, a word processor and an information processing terminal.

25. A device according to claim 21, wherein the information processing device further comprises at least one selected from the group consisting of a VRAM and a D/A converter.

* * * * *